Feb. 5, 1963 SABURO SHOJI ET AL 3,076,872
SYSTEM FOR THE GENERATION AND TRANSMISSION OF PULSE GROUPS
Filed Feb. 11, 1960 4 Sheets-Sheet 4

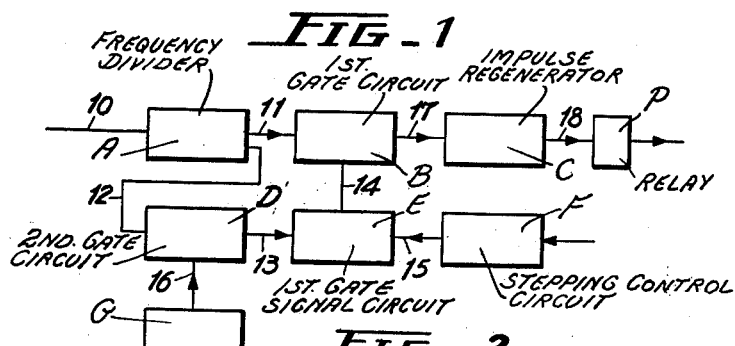
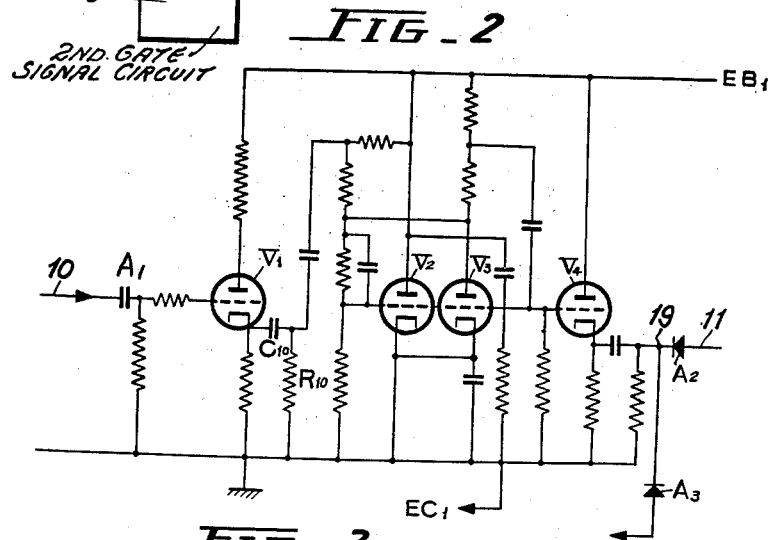
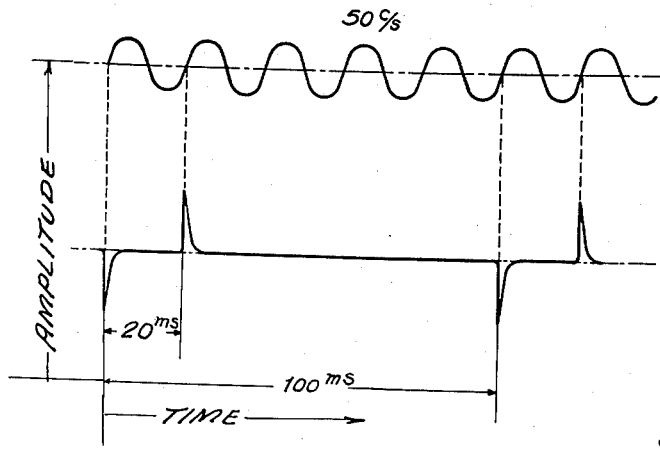

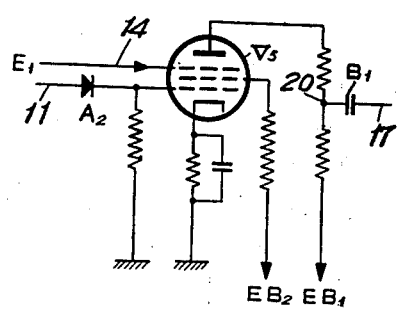
FIG.-4
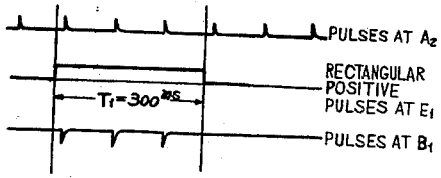
FIG.-5
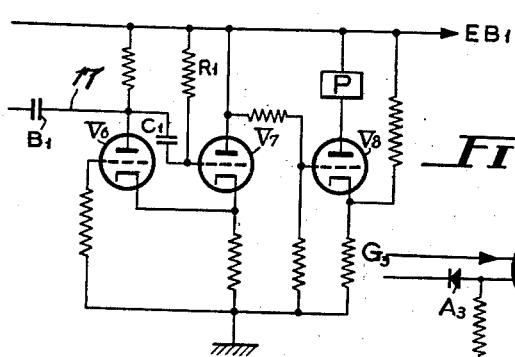
FIG.-6
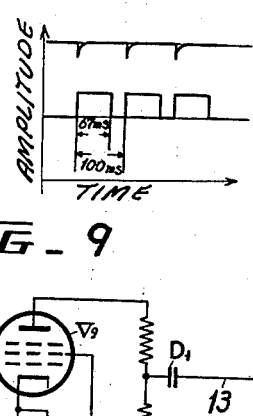
FIG.-7
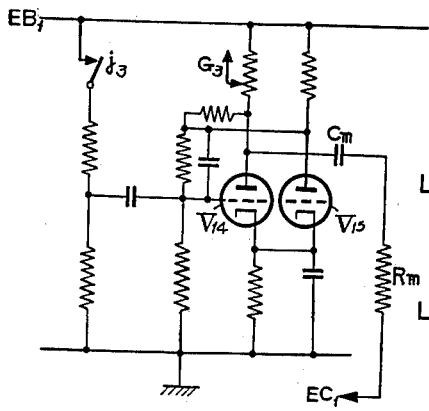
FIG.-13
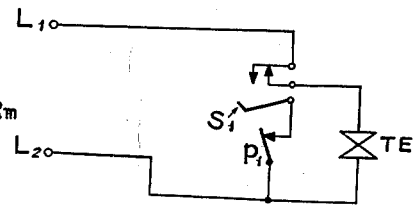
FIG.-9
FIG.-8
INVENTORS
SABURO SHOJI
SHOICHI HASEGAWA
BY

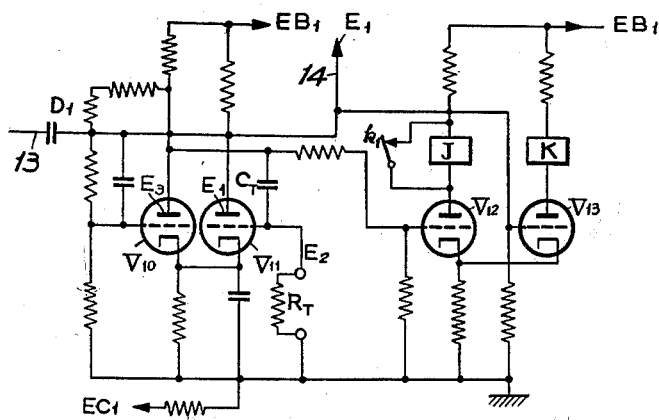

INVENTORS
SABURO SHOJI
SHOICHI HASEGAWA
BY

United States Patent Office 3,076,872
Patented Feb. 5, 1963

3,076,872
SYSTEM FOR THE GENERATION AND TRANSMISSION OF PULSE GROUPS
Saburo Shoji and Shoichi Hasegawa, Tokyo-to, Japan, assignors to Kanda Tsushin Kogyo Kabushiki Kaisha, Tokyo-to, Japan
Filed Feb. 11, 1960, Ser. No. 8,089
Claims priority, application Japan Feb. 14, 1959
8 Claims. (Cl. 179—90)

This invention relates to a system for the generation and transmission of a series of pulse groups, each having any selected number of digit pulses, especially suitable for dialing pulses having a very low frequency, such as 10–20 cycles per second.

For generating groups of selected numbers of such low frequency digit pulses, mechanical systems have hitherto been used. A conventional means to produce such low frequency pulses utilizes a rotatable member such as a dial, by turning of which a group of any selected number of pulses can be generated according to the angular movement of the rotatable member. Another conventional system employs a cam in order to obtain the effects resulting from the angular displacement of the dial, by the corresponding stroke of a slidable member. Such conventional mechanical systems utilize variations of physical length to change the number of pulses, which fact inevitably requires at least a mechanically movable member, such as a dial, cam, slide and the like. Employment of such a mechanical means, however, gives rise to mechanical wear, which in turn may invite inaccurate operation of machine parts and seriously shortened life thereof, in addition to difficulties in remote control.

In such a device, further, if the selected physical quantity, such as angle or length of movement of a control member, such as a dial or a slide, is set inadvertently or by mishandling at an intermediate position between two successive, but stepwise predetermined, positions corresponding to two successive pulses, the device will generate a smaller number of pulses or a next larger number of pulses, according to the sense of the misadjustment, which results in a miscount of pulses.

It is, therefore, a main object of the invention to provide an electric pulse generating system, by means of which groups of pulses having accurate wave form of accurate frequency can be generated and in which the number of pulses as selected can be easily and accurately controlled.

Another object of the invention is to provide an electric pulse generating system, by means of which digital data transmission having a speed of the order of that of dial pulses is provided.

Another object of the invention is to provide an electric pulse generating system, wherein the remote control, if wanted, can be easily carried out.

Another object of the invention is to provide an electric pulse generating system having a minimum number of movable elements, thus ensuring a longer durable life of the system.

Still another object of the invention is to provide an electric pulse generating means, which may produce groups of selected pulses adapted especially for use in an automatic telephone calling system.

Still a further object of the invention is to provide an electric pulse generating means, wherein undesirable miscount of number of pulses can substantially be avoided.

According to this invention, any number of pulses to be generated is represented by a corresponding electrical element.

More specifically, the time constant of an electronic means, preferably a single-shot multivibrator, is varied depending upon the selected number of pulses. It can be said that the principle of the present invention is based upon the control of digital values by time periods. More specifically, each selected number of pulses corresponds to a different value of the time constant of an electronic element, preferably a single-shot multivibrator. For this purpose a gate circuit is employed. In this case, the peak of each pulse must be synchronized with the operation of the gate. According to this invention, commercial frequency current is utilized to synchronize the generation of pulses with the issuing of the necessary gate signals. In the system according to the invention, on the other hand, any required number of pulses are controlled by modifying the R-C time constant of a single-shot multi-vibrator by changing either C or R thereof. Further, in the system according to the invention the length of the trigger pulse is considerably shorter than the period of a dial pulse, so that any undesired miscount of number of pulses may be effectively avoided.

The invention may, in addition to the application thereof to an automatic telephone calling system, be applicable to any digital control means wherein it is necessary to generate and transmit groups of selected number of pulses as digital information. For the pulse wave form, rectangular, or triangular waves, saw-tooth or any desired wave shape can be employed as occasion may require.

The above and further objects and novel features of the present invention will more fully appear from the following detailed description when the same is read in connection with accompanying drawings. It is to be expressly understood, however, that the drawings are for the purpose of illustration only and are not intended as a definition of the limits for the invention.

In the drawings, wherein like reference characters refer to like parts throughout the several views:

FIGURE 1 is a block diagram illustrating a system according to this invention;

FIGURE 2 illustrate an embodiment of the frequency dividing circuit, diagrammatically shown in FIGURE 1 by a block A;

FIGURE 3 is an explanatory diagram showing the relation between the wave form of commercial frequency current and that of pulses generated by the frequency dividing circuit shown in FIGURE 2;

FIGURE 4 illustrates an embodiment of the first gate circuit, diagrammatically shown in FIGURE 1 by a block B;

FIGURE 5 is an explanatory diagram, illustrating input and output signal waves to and from the first gate circuit shown in FIGURE 4, respectively;

FIGURE 6 illustrates an embodiment of the impulse regenerating circuit, diagrammatically shown in FIGURE 1 by a block C;

FIGURE 7 is an explanatory diagram of input and output signal waves to and from the impulse regenerating circuit shown in FIGURE 6.

FIGURE 8 illustrates a telephone circuit having an impulsing contact, which operates under the control of the system according to the invention;

FIGURE 9 illustrates an embodiment of the second gate circuit, diagrammatically shown in FIGURE 1 by a block D;

FIGURE 10 illustrates an embodiment of the first gate signal circuit, diagrammatically shown in FIGURE 1 by a block E;

FIGURE 11 illustrates wave forms relating to the first gate signal circuit shown in FIGURE 10;

FIGURE 13 illustrates an embodiment of the second gate signal circuit, diagrammatically shown in FIGURE 1 by a block G;

FIGURE 14 illustrates a memory element in the form of a punched card adapted to select specific groups of pulses, for instance, corresponding to digit pulse groups for a specific telephone number;

FIGURE 16 illustrates a push button arrangement employable instead of a plurality of punched cards, such as illustrated in FIGURE 14.

Figure 12:
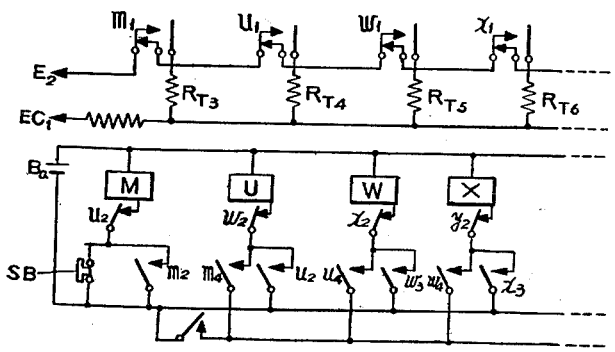
FIGURE 12 illustrates an embodiment of the first signaling time period stepping control circuit, diagrammatically shown in FIGURE 1 by a block F.

Now, referring to the drawings, especially FIGURE 1 thereof, illustrating the system according to the invention in a block diagram, A.C. current of commercial frequency such as 50 or 60 cycles per second is supplied from a power supply source (not shown) through supply lines 10 to a frequency dividing circuit A of conventional design, preferably consisting of an R-C oscillator, the supply lines 10 being represented in FIG. 1 diagrammatically by a single line for simplification of the drawing, which applies to similar cases in the same figure. The supplied current is thus reduced in its frequency to one fifth or one sixth of the original frequency, more specifically to 10 cycles per second, by passage through the above mentioned frequency dividing circuit A, thus forming a continuous series of trigger pulses, which are thence conveyed through line 11 to a first gate circuit B and through line 12 to a second gate circuit D, respectively. Reference character E denotes a first gating signal circuit, which is adapted to receive signals from circuit D through line 13 and to generate and transmit a signal through line 14 for closing the first gate circuit B for a time interval corresponding to a desired number of pulses. The time constant necessary for the determination of the time interval in each case is determined by a first signaling time period stepping-control circuit F, which includes a number of resistance elements and a fixed capacitor, or a number of capacitance elements and a fixed resistor, as the case may be, and acts upon the circuit E through connecting line 15 in a manner as described hereinafter referring to FIGURE 12 or 15. A second gating signal circuit G generates in each case a signal preferably of 600 milliseconds corresponding to, for instance, the minimum pause between successive dialing pulse groups corresponding to digits, for instance, of any selected telephone number and transmits it through line 16 to the second gate circuit D, thence through line 13 to the first gating signal circuit E, which conditions thereby the first gate circuit B. In this way, the gate circuit B functions so that the above mentioned kind of 10 milliseconds trigger pulses are transmitted therefrom through line 17 to an impulse regenerating circuit C for a desired time period in each case corresponding to a group of pulses denoting, for instance, a digit of a selected telephone number, a pause preferably of 600 milliseconds is provided, and then a second group of pulses corresponding to the next digit contained in the telephone number and so on. In a manner described more in detail hereinafter with reference to FIGURE 6, these trigger pulses are transformed by the impulse regenerating circuit C into the corresponding number of rectangular wave pulses, which are transmitted therefrom through line 18 to a relay P, a movable contact $p_1$ (FIGURE 8) of which generates thereby the corresponding number of the desired pulses similar to those otherwise generated by manipulating a telephone dial.

A preferred embodiment of the frequency dividing circuit A illustrated in FIGURE 1 in block form, is shown in FIGURE 2 more in detail.

In this circuit, current having commercial frequency of 50 or 60 cycles per second is fed at $A_1$ from line 10, as already described, this current, after passage through cathode follower or amplitude limiting tube $V_1$ and a differential circuit including resistor $R_{10}$ and capacitor $C_{10}$ and having a time constant of an appreciably small value, being divided in its frequency, to a signal frequency of 10 cycles per second by passing through a single shot multi-vibrator comprising tubes $V_2$ and $V_3$. The thus frequency-divided current passes through a cathode follower tube $V_4$ and is taken out at a point 19 and through diode $A_2$ or $A_3$, as the case may be, and serves as trigger pulses. The relation between the originally fed commercial current, for instance, of 50 cycles per second, and the thus developed trigger pulses at the junction point 19 is illustrated diagrammatically in FIGURE 3. It will be noted, that in this case of trigger pulses a negative pulse is generated at first and then after a time lapse of, say, 20 milliseconds a positive pulse follows. Thereafter, there is a pause of, for instance, 100 milliseconds and then a negative and a positive pulse are again generated, and so on.

A preferred embodiment of the first gate circuit B of FIGURE 1 is illustrated in FIGURE 4, by way of example and more in detail, which shows a pentode type gate circuit. More specifically, the trigger pulses from the frequency dividing circuit A through the connecting line 11 with the diode $A_2$ inserted therein and having thus positive polarity, are fed to the first grid of the pentode $V_5$, while a rectangular wave pulse having a variable duration period $T_1$, as shown by way of example at the centre of FIGURE 5, and supplied at $E_1$ (FIGURE 4) through the connecting line 14 (FIGURES 1 and 4) from the first gating signal circuit E is applied to the third grid of pentode $V_5$. Thus, the gate will be closed during the time period, and the pulses supplied at $A_2$ will thus be delivered at a point 20 in the line 17, connected to a condenser $B_1$ (see, also FIGURE 6). In other words, by the combined influence of the pulses applied on the first grid and the voltage applied on the third grid, current pulses as shown at the lowermost part of FIGURE 5 will flow through the plate circuit of tube $V_5$. Assuming that the time interval in this case is 300 milliseconds, as denoted at the middle part of FIGURE 5, three pulses will be delivered at $B_1$ during the time period $T_1$.

A preferred embodiment of the impulse regenerating circuit shown as a block C in FIGURE 1, is illustrated more in detail and by way of example in FIGURE 6, representing a single shot or stable multivibrator circuit including tubes $V_6$ and $V_7$. When the values of a capacitor $C_1$ and resistor $R_1$ connected in parallel to each other with the grid of a triode $V_7$ contained in the multivibrator circuit, are so selected as to make the non-conductive period of triode $V_7$ to be 67 milliseconds, supply of a group of pulses at the point $B_1$, as seen at the left of FIGURE 6, such as shown by way of example at the upper part of FIGURE 7, will energize, through triodes $V_6$, $V_7$ and $V_8$, the relay P with a rectangular wave current as shown at the lower part of FIG. 7, the last mentioned tube $V_8$ acting as a D.C. amplifier.

The movable contact $p_1$ (FIGURE 8) of the relay P is connected through a switch $S_1$ to a subscriber's line $L_1$, $L_2$, a telephone set TE being connected in parallel therewith. When the switch is set to make contact, the telephone set TE will be disconnected from the subscriber's line, while the relay contact $p_1$ is connected with the line and, by the operation of relay P, a series of dialing pulses having a make ratio of 33% are sent out from contact $p_1$ through the subscriber's line to an automatic office switch board, not shown, for calling a selected subscriber.

The second gate circuit D shown in a block diagram in FIGURE 1 is illustrated more fully in FIGURE 9 by way of example, which represents a pentode type gate circuit. The third grid of pentode $V_9$ is normally supplied with a potential of such a value, at $G_3$, that the pentode will not be cut off. When, however, the rectangular wave shown at the middle of FIGURE 5 terminates or becomes nil after a conductive period $T_1$, a negative potential is simultaneously applied through $G_3$ to the third grid of tube $V_9$, and continues for 600 milliseconds corresponding to the minimum pause between digit pulse groups of a telephone number. During this pause, the gate circuit is opened and thus no trigger pulses are applied to a condenser $D_1$ included in line 13.

The first gate circuit E shown in the block diagram of

FIGURE 1 is illustrated more in detail and by way of example in FIGURE 10, which shows a single-shot or stable multi-vibrator circuit. With this circuit, trigger pulses, supplied through line 13 to the condenser $D_1$ therein from the output of the above mentioned pentode-type gate circuit of stage D, are applied in their positive form to the single-shot multi-vibrator comprising a couple of triodes $V_{10}$ and $V_{11}$. A variable composite resistor $R_T$, which will be described more in detail hereinafter in connection with FIGURE 12, is inserted in the grid circuit of the tube $V_{11}$, this resistor determining the desired time constant of the multi-vibrator in co-operation with a capacitor $C_T$, the capacitance of which is included in the grid circuit and is constant in the present embodiment, in such a way that, with regular supply of positive trigger pulses to the condenser $D_1$ as already mentioned, the one tube $V_{10}$ is non-conductive and the other tube $V_{11}$ is conductive, respectively at the first instant, but the conductive conditions of the both tubes $V_{10}$ and $V_{11}$ are reversed at the arrival of the first pulse. Depending upon the time constant determined in each case by the values of $C_T$ and $R_T$, the potential applied at the grid of tube $V_{11}$ gradually increases and exceeds the cut-off value thereof at the time when the fourth pulse arrives thereat in this example, so that the last mentioned tube becomes conductive. Next, with the fifth pulse, in this case, the tube $V_{11}$ is cut off and, with the eighth pulse, it again becomes conductive, and so on. In this case, the values of $C_T$ and $R_T$ can be so selected that the conductive period of tube $V_{11}$ is an integral multiple of the period of one pulse duration. In the arrangement shown in FIGURE 10, two pentodes $V_{12}$ and $V_{13}$ are inserted in the circuit. A relay J is inserted in the plate circuit of the tube $V_{12}$, while in the plate circuit of the tube $V_{13}$ there is provided a delay relay K. The above mentioned circuit shown in FIGURE 10 is so designed that, when the tube $V_{10}$ is non-conductive, the tube $V_{12}$ is conductive, and that when tube $V_{11}$ is conductive the tube $V_{13}$ will become non-conductive. Normally, the tube $V_{12}$ is conductive, and the relay J is non-operative because the contact $k_1$ connected in parallel with the relay, as shown, is closed. In this case, the tube $V_{13}$ is non-conductive, as above mentioned, so that the relay K connected in series therewith, is also non-operative. At the arrival of the first pulse at $D_1$, the tube $V_{13}$ will thereafter become conductive during the time interval $T_3$ shown in FIGURE 11, in the present specific example, whereby the relay J will be transferred. Further, at the arrival of the fourth pulse, the tube $V_{12}$ becomes conductive and the tube $V_{13}$ becomes non-conductive, thus the relay J will be operative during the delay time period of relay K. In other words, the relay J operates during the delay time period of relay K each time the tube $V_{13}$ is conditioned from conductive to non-conductive. Such operation of relay J is utilized as a change-over initiating signal for the next stage F or, more specifically, the first gate signal time modifying circuit and, at the same time, as an initiating signal for stage G to transmit the second gate signal for the required minimum pause as already explained. The plate voltage output is supplied to the stage B, or the first gate circuit, from tube $V_{11}$ through a point $E_1$ and line 14.

The first signaling time period stepping-control circuit F shown in FIGURE 1 in block form is illustrated in FIGURE 12 more in detail and by way of example. As already mentioned, the resistance $R_T$ shown in FIGURE 10 is variable in this case and comprises a plurality of parallel-connected resistance elements $R_{T3}$, $R_{T4}$, $R_{T5}$ . . . as shown in FIGURE 12, each of which provides a specific time constant in combination of the capacitance $C_T$ shown in FIGURE 10. The stepping change-over of these resistance elements is controlled, in the manner as described hereinbelow, by a group of contacts of parallel-connected relays M, U, W, X . . . shown in FIGURE 12, these relays being connected with a D.C. current source Ba as shown.

When a starting push button SB is depressed, the relay M is energized and held by one of its contacts $m_2$. At the same time, its contact $m_1$ operates, and the resistance element $R_{T3}$ is connected through line $E_2$ to the grid of tube $V_{12}$. Thus, as already mentioned, the relay J (FIGURE 10) is energized to operate one of its contacts $j_2$ (FIGURE 12), so that the circuit for relay U is established through closed contacts $j_2$, $m_4$ and $w_2$. The next relay U is thereby energized and one of its contacts $u_2$ is opened to restore the relay M to its normal position. One of the contacts $m_1$ of the relay M thus cuts off the related resistance element $R_{T3}$. As one of contacts $u_1$ of the relay U operates to connect its related resistance element $R_{T4}$ with line $E_2$, a new time constant is determined by the present combination of the constant capacitor $C_T$ and the resistance element $R_{T3}$, so that a gate signal adapted to count the corresponding different number of pulses is transmitted. In a similar manner, stepwise operation is successively shifted to relay W, X and so on, and each time a specified group of pulses may be generated and transmitted.

The second gating signal circuit shown diagrammatically with a block G in FIGURE 1, is illustrated more in detail and by way of example in FIGURE 13, which represents a single-shot multi-vibrator circuit, including a couple of tubes $V_{14}$ and $V_{15}$. The tube $V_{14}$ is selected to have a conductive period of, for instance, 600 milliseconds, by properly determining the time constant in dependence of the combination of capacitance $Cm$ and resistance $Rm$ connected thereto as shown. The voltage output of the plate circuit is applied as second gate signal to the third grid $G_3$ of the tube $V_9$ shown in FIGURE 9, and decreases for a period 600 milliseconds each time one of contacts $j_3$ of the relay J becomes make and acts as the signal to open the second gate circuit. This opening period represents the required minimum pause between successive pulse groups.

It should be noted that reference characters $EB_1$, $EB_2$, and $EC_1$ are shown in the several figures for guidance to clarify the connections between the several circuits shown in the foregoing drawings.

For simplification of the drawings and related description given hereinbefore, the above mentioned preferred embodiment has been illustrated to generate and transmit a specified series of pulse groups. The present system is, however, also applicable to the case wherein any selected series of pulse groups, for instance, adapted for generating and transmitting any selected series of digit pulses corresponding to a telephone number selected out of those as kept reserved beforehand in the memory section of an automatic telephone calling apparatus. Such a possibility will become clear as the description proceeds in connection with further embodiments of the invention as illustrated in FIGURES 14–16 inclusive.

FIGURE 14 shows a punched card to be used as a memory element. In this card, there are shown four horizontal rows of punching positions, each of these rows designated by A, B, C and D, respectively, consisting of ten successive positions, wherein shaded small circles show punched and non-shaded ones represent non-punched positions, respectively. In this card, each column I, II, III . . . IX or X represents a figure of a numerical number. On the other hand, a punched position in the first or uppermost line represents a value of 1. In the similar way, a punched position in the second lower line represents a value of 2. The third lower and the fourth or lowest line represent numerical values 4 and 8, respectively. The digit of any column is represented by a total sum of these fundamental values 1, 2, 4 and 8, if any. If there be no punched position in a column, it represents nothing. In the card, shown by way of example in FIGURE 14, it will be noted that a number "4971550" is represented by a plurality of punched holes. As shown, the card is provided a plurality of recesses and projections, which serve for prevention of misinsertion and for ascertainment of correct conductive position of the card.

When the above mentioned card is inserted in a selector (not shown), a number of electrical channels corresponding to the number stored in the card, are established as illustrated more in detail in connection with FIGURE 15 hereinbelow.

Figure 15:
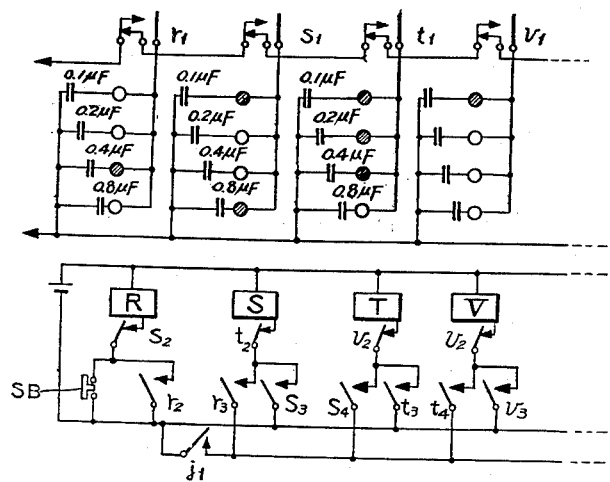
FIGURE 15 illustrates a somewhat modified circuit differing from that shown in FIGURE 12.

FIGURE 15 shows a somewhat modified arrangement from that shown in FIGURE 12. In the preceding embodiment, the time constant is changed as desired by modifying the value of the resistance component, while the capacitance component is maintained at a constant. On the contrary, in the embodiment shown in FIG. 15, while the resistance component is kept constant, the value of the capacitance component is modified to produce the specific time constant necessary for the generation of the required number of pulses representing each digit. It will be, however, noted, that the constant capacitance or resistance component may be varied in several stages, if desired.

In this embodiment, when the already illustrated punched card is inserted in the selector (not shown), a plurality of channels including shaded circles in FIGURE 15 is made conductive, while other channels including positions denoted by blank circles are kept non-conductive. When the push button SB is depressed, all stages A–G (FIGURE 1) are set to start, and at the same time, the first one out of a plurality of parallel-connected relays R, S, T, V . . . is actuated at first and one of its contacts $r_1$ is closed to connect a 0.4 microfarad condenser, included in one of the conductive channels as shown, through line 15 to the first gate signal circuit E (FIGURE 1). Now, assuming that a time constant corresponding to 100 milliseconds requires 0.1 microfarad, and similarly 200 milliseconds correspond to 0.2 microfarad; 400 milliseconds to 0.4 microfarad; 800 milliseconds to 0.8 microfarad, and so on, a signal for 400 milliseconds is sent out in this case through the closed relay contact $r_1$. After time of 400 milliseconds, a suitable relay in the circuit E, corresponding to the relay J shown in FIGURE 10, is actuated and one of its contacts $j_1$ in FIGURE 15 is transferred. Then, the next relay S is actuated through now transferred $r_3$ of the relay R and a normally closed contact $t_2$ of the relay T, while the relay R is restored. By the energization of the relay S, one of its contacts $s_1$ is closed, and two conductive channels having a 0.1 microfarad condenser and an 0.8 microfarad condenser, respectively, in the related selector stage shown in the upper part of FIGURE 15, are connected in parallel to line 15. Thus, a capacitance of 0.9 microfarad total is connected, in this case, to line 15. When pulses are again transmitted from the stage B shown in FIGURE 1, at the end of the aforementioned time period of 600 milliseconds corresponding to a pause between successive pulse groups, the operation is made effective for a time period of 900 milliseconds corresponding to the above mentioned value of 0.9 microfarad. At the end of this pulse transmitting period, a minimum pause-initiating signal is issued and at the same time the relay contact $j_1$ is transferred as in the above mentioned manner, the control being thus stepped to the next relay T. In this manner, the above mentioned device repeats the operation cycle of pulse-transmission and the pause-making until the desired number of pulse groups corresponding, for instance, to the digit pulses representing a telephone number stored in a selecting card as explained in connection with FIGURE 14, is transmitted. In the present example shown and illustrated in FIGURES 14 and 15, pulse groups corresponding to a telephone number "4971550" will be issued from the device.

The punched cards as illustrated hereinbefore, are designed to store telephone numbers in a coded manner, based upon the arithmetic combinations of basic numerals 0, 1, 2, 4 and 8. The mode of coding may be, if desired, varied according to conventional technique. One way is by way of example, shown and described in copending U.S. application, Serial No. 854,366, filed November 20, 1959. If desired, reference may be had thereto.

FIGURE 16 shows a somewhat modified arrangement from those shown in FIGURES 12 and 15. In this embodiment, a plurality of push buttons $SS_1$, $SS_2$, $SS_3$ . . . are employed instead of the corresponding number of punched cards. In this drawing, the stepping-control circuit as denoted by reference characters SC and shown more in detail in FIGURE 12 or 15, below, is shown diagrammatically by a block. From the foregoing description in connection with FIGURES 12 or 15, the operation will be clear to those skilled in the art, so that the explanation thereof has been omitted herein.

Although for the purpose of explaining the invention certain particular embodiments adapted for use with an automatic telephone calling system have been disclosed, obvious modifications will occur to a person skilled in the art, and it is not desired to be limited to the exact details shown and described. For instance, vacuum tubes herein disclosed may be replaced by transistors according to the known technique. In this case, instead of positive trigger pulses those of negative polarity may be preferably used.

The invention having thus been described, that which is believed to be new and for which protection by Letters Patent is desired, is:

1. In a system for the generation and transmission of pulse groups, each of which consists of a number of selected digit pulses, especially adapted for dialing pulses of an automatic telephone calling apparatus; the combination comprising a constant relatively low frequency current source; a frequency divider having its input connected to said source to convert its input current into a series of very low frequency trigger pulses; a gate circuit connected to said divider to pass trigger pulses of a selected polarity; and a gate signal circuit connected to said gate circuit and including a single-shot multi-vibrator supplying to said gate circuit a closing signal having a time interval corresponding to a selected number of said trigger pulses; said multi-vibrator having a selectively variable time constant; whereby said gate circuit will pass only a selected number of trigger pulses corresponding to the selected time constant of said multi-vibrator.

2. In a system for the generation and transmission of pulse groups, each of which consists of a number of selected digit pulses, especially adapted for dialing pulses of an automatic telephone calling apparatus; the combination comprising a constant relatively low frequency current source, a frequency divider having its input connected to said source to convert its input current into a series of very low frequency trigger pulses; a gate circuit connected to said divider to pass trigger pulses of a selected polarity; a gate signal circuit connected to said gate circuit and including a single-shot multi-vibrator supplying to said gate circuit a closing signal having a time interval corresponding to a selected number of said trigger pulses; said multi-vibrator having a selectively variable time constant; whereby said gate circuit will pass only a selected number of trigger pulses corresponding to the selected time constant of said multi-vibrator; a pulse regenerator connected to the output of said gate circuit and including a single-shot multi-vibrator converting trigger pulses passed by said gate circuit into a coresponding number of rectangular pulses; and a pulse-responsive relay connected to said pulse regenerator and energized by each of said rectangular pulses to provide a corresponding dialing pulse.

3. In a system for the generation and transmission of pulse groups, each of which consists of a number of selected digit pulses, especially adapted for dialing pulses of an automatic telephone calling apparatus; the combination comprising a constant commercial frequency current source; a frequency divider having its input connected to said source and including a differential circuit and a single-shot multi-vibrator operable to convert its input current into a series of very low frequency trigger pulses; a gate circuit connected to said divider to pass trigger pulses of a positive polarity; a gate signal circuit connected to said gate circuit and including a single-shot multi-vibrator supplying to said gate circuit a closing signal having a time interval corresponding to a selected number of said trigger pulses; said second-named multi-vibrator having a selectively variable time constant, whereby said gate circuit will pass only a selected number of triger pulses corresponding to the selected time constant of said second-named multi-vibrator; a pulse regenerator connected to the output of said gate circuit and including a single-shot multi-vibrator converting trigger pulses passed by said gate circuit into a corresponding number of rectangular pulses; a pulse-responsive relay connected to said pulse regenerator and energized by each of said rectangular pulses to provide a corresponding dialing pulse; and a stepping control means including a plurality of sequentially energized stepping relays, each corresponding to a selected pulse group and each operable, when energized, to connect, into the time-constant-determining means of said second-named multi-vibrator, a selected time determining component having a value corresponding to the number of pulses in the respective corresponding pulse group.

4. In a system for the generation and transmission of pulse groups, as claimed in claim 3, a plurality of parallel closing signal channels associated with each of said stepping relays and each including a specific capacitance element constituting the selected time determining component of said time-constant-determining means, and a punched card cooperable with said channels to make selected ones of said channels conductive.

5. In a system for the generation and transmission of pulse groups, as claimed in claim 3, a plurality of parallel closing signal channels associated with each of said stepping relays and each including a specific resistance element constituting the selected time determining component of said time-constant-determining means; and a punched card cooperable with said channels to make selected ones of said channels conductive.

6. In a system for the generation and transmission of pulse groups, as claimed in claim 3, a plurality of parallel closing signal channels associated with each of said stepping relays and each including a specific capacitance element constituting the selected time determining component of said time-constant-determining means; and push button means operatively associated with said stepping control means and effective to make selected ones of said channels conductive.

7. In a system for the generation and transmission of pulse groups, as claimed in claim 3, a plurality of parallel closing signal channels associated with each of said stepping relays and each including a specific resistance element constituting the selected time determining component of said time-constant-determining means; and push button means operatively associated with said stepping control means and effective to make selected ones of said channels conductive.

8. In a system for the generation and transmission of pulse groups, as claimed in claim 3, a second gate circuit having its input connected to said divider and its output connected to said gate signal circuit; and a second gate signal circuit connected to said second gate circuit and including a single-shot multi-vibrator supplying to said second gate circuit a closing signal having a time interval corresponding to the selected time interval between pulse groups passing through said first gate circuit; said gate circuit, when supplied with said last named closing signal from said second gate signal circuit, conditioning said first gate signal circuit to render said first gate non-conductive.

References Cited in the file of this patent

UNITED STATES PATENTS

| | | |
|---|---|---|
| 2,686,264 | Gray | Aug. 10, 1954 |
| 2,782,372 | Barditch | Feb. 19, 1957 |
| 2,835,868 | Lindesmith | May 20, 1958 |
| 2,927,971 | Busaler et al. | Mar. 8, 1960 |